3,155,658
AMINOHYDROXY FATTY AMIDES
Edgar R. Rogier, Hopkins, Minn., assignor to General Mills, Inc., a corporation of Delaware
No Drawing. Filed Dec. 21, 1960, Ser. No. 77,296
14 Claims. (Cl. 260—247.2)

This invention relates to novel amides and more particularly to amino-hydroxy fatty amides.

It is an object of this invention to provide a class of novel highly useful compounds. Other objects will appear hereinafter.

The novel compounds of the present invention are the amino-hydroxy-N,N-disubstituted fatty amides represented by the formula:

$$R'''-N-\underset{\underset{O}{\overset{R''}{|}}}{\overset{R-}{\underset{|}{C}}}-R'-\left[-\underset{\underset{OH}{|}}{C}-\underset{\underset{NXY}{|}}{C}-\right]$$

where R is hydrogen or a monovalent aliphatic radical having 1 to 19 carbon atoms, R' is a divalent aliphatic radical having 1 to 19 carbon atoms, the sum of the carbon atoms in R and R' is 5 to 21 carbon atoms preferably 9 to 17 carbon atoms, R" and R''' are selected from the group consisting of hydrogen, aliphatic radicals, aryl radicals, and a cyclic ring containing both R" and R''', and X and Y are selected from aryl radicals, hydrogen radicals, aliphatic radicals and a cyclic ring containing both X and Y. The formula, shown above, illustrates two isomeric groups of compounds:

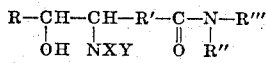

and

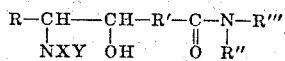

where R, R', R", R''', X and Y are as described above. Hereinafter the description will be restricted to a single isomeric form; however, it will be understood that the description applies equally to both isomeric forms.

As used herein, the term fatty shall refer to an aliphatic hydrocarbon radical having 8 to 22 carbon atoms. Fatty radicals are normally derived from fatty acids. The term "fatty acids" as used herein refers to aliphatic carboxylic acids having 8 to 22 carbon atoms.

The novel compounds of the present invention are readily prepared from fatty acids. Illustrated below is the preparation of a 9(10)-amino-10(9) hydroxy-N,N-dimethylstearamide from oleic acid.

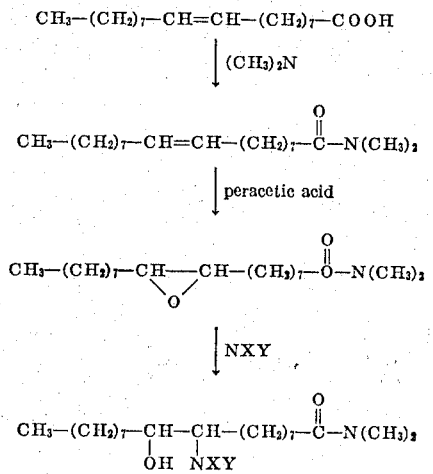

where X and Y are hydrogen aliphatic, aryl, or members of a cyclic ring.

All unsaturated fatty acids are generally useful in preparing the compounds of the present invention. These fatty acids occur naturally in animal fats and oils. Examples of suitable fatty acids include, oleic, erucic, oleostearic, linoleic, linolenic, clupanodonic, palmitoleic and palmitolenic.

The substituents on the amide nitrogen are not critical and virtually all organic radicals are suitable. The amides are conveniently prepared by reacting an unsaturated fatty acid with ammonia, a primary amine or a secondary amine. Reaction with ammonia gives an unsubstituted amide while reaction with primary and secondary amines give mono-substituted and di-substituted amides, respectively. Generally, the reaction is carried out at 150° C. to 200° C. at atmospheric pressure. It is preferred to remove the byproduct water from the reaction mixture by means of a "sweep" gas. In the case of ammonia and the low molecular weight amines, these volatile materials may themselves serve as a "sweep."

All secondary amines are generally useful in preparing the unsaturated N,N-substituted fatty amides. The preferred secondary amines are the dialkyl amines wherein the alkyl radical contains 1 to 20 carbon atoms. Suitable secondary amines include diethyl amine, methylethyl amine, dibutyl amine, methylhexyl amine, dioctyl amine, methyldodecyl amine, methylstearyl amine, distearyl amine, N-methylcyclohexyl amine, N-methylaniline, N-butylaniline, and morpholine.

All primary amines are generally useful in preparing the unsaturated N-substituted fatty amides. The preferred amines are the alkyl amines wherein the alkyl group contains 1 to 20 carbon atoms. Suitable primary amines include methyl amine, butyl amine, hexyl amine, dodecyl amine, stearyl amine, cyclohexyl amine and aniline.

The epoxy amides are prepared from the unsaturated amides by standard epoxidation technique. A preferred method involves the oxidation of the unsaturated amide with peracetic or perbenzoic acid. The preparation of epoxy-N,N-substituted fatty amides is described in my copending U.S. patent application, Serial No. 77,293, filed December 21, 1960, now abandoned.

The final step in the preparation of the novel compounds of this invention, is the cleavage of the epoxide bond by ammonia, a primary amine, or a secondary amine to form an aminohydroxy fatty amide. If a primary amine is used to split the carbon to oxygen bond, the resulting product becomes a secondary amino compound, thus:

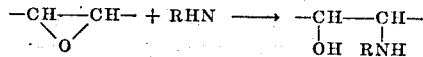

Where a secondary amino compound is used to cleave the epoxide ring a tertiary amino compound is formed viz:

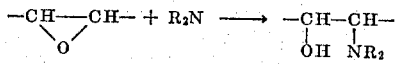

If ammonia is used as the cleaving agent, a primary amino compound is formed:

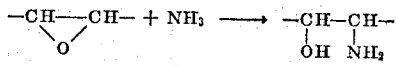

Generally, all primary and secondary amines are suitable as cleaving agents for the epoxide compound. Specific examples of suitable amines include dimethylamine, butyl amine, ethylene diamine, cyclohexyl amine, methylhexylamine, butylstearyl amine, distearyl amine, stearyl amine, N-methylaniline, N-butylaniline, aniline, morpholine, ethanol amine and piperidine.

One of the most preferred group of products are those derived from oleic acid. The structure of these products is represented by the formula:

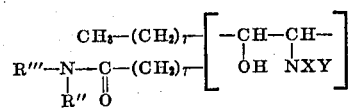

where R″, R‴, X and Y are as previously described.

Another preferred group of compounds are those derived from the mono-unsaturated acid obtained by hydrogenating the 9,10 double bond in linoleic acid. This group of compounds is represented by the formula:

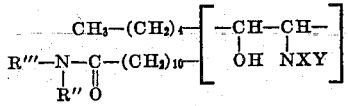

where R″, R‴, X and Y are as previously defined.

Still another group of preferred compounds are those derived from palmitoleic acid. These compounds are represented by the formula:

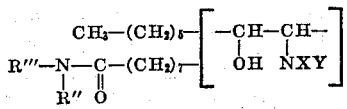

where R″, R‴, X and Y are as previously described.

Thus, the most preferred groups of compounds are represented by the formula:

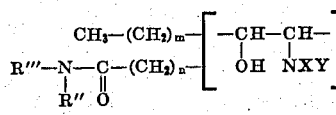

where R″, R‴, X and Y are as previously described and $m+n$ is 12 or 14.

As stated hereinbefore the preparation of the compounds of the present invention by the method illustrated above, will produce a mixture of two isomers since the epoxy ring may be split at either carbon to oxygen bond. In the reaction scheme shown above, the two isomers would be formed:

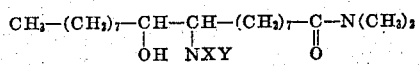

and

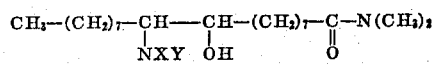

where X and Y are hydrogen aliphatic, aryl or members of a cyclic ring. These groups of compounds are the 9-amino-10-hydroxy-N,N-dimethyl stearamides and the 10-amino-9-hydroxy-N,N-dimethyl stearamides, respectively. For convenience, isomers of this type are often referred to by an alternative nomenclature, e.g., 9(10)-amino-10(9) hydroxy-N,N-dimethyl stearamides.

In order to illustrate various features of the present invention, as well as the preferred embodiments thereof, the following examples are included.

Example I

Dimethyl amine was bubbled through 2,361 g. of oleic acid maintained at 250° C. until the acid number of 5 was attained, a period of 8 hours. The resulting crude product was extracted with methanolic potassium hydroxide to remove the free acid. After distillation under vacuum, there was recovered 2,175 g. of N-N-dimethyl-oleamide having an iodine value of 79.8 and an acid value of 0.6.

Into a stirred 5 liter flask were charged 1100 g. of the N,N-dimethyl-oleamide. Over a period of 1.5 hours there was added 1150 ml. of 40% peracetic acid containing 45 g. of sodium acetate. The temperature during this period was held at 30° C. After washing and drying under high vacuum there was obtained 1153 g. of product having an iodine value of 2.6 and 4.3% oxirane oxygen as determined by pyridine-HCl tritration. Recrystallization from acetone at −14° C. yielded white, crystalline 9,10-epoxy-N,N-dimethyl-stearamide having a nitrogen analysis of 4.2%, an oxirane oxygen analysis of 4.7% and a melting point of 33.4–34.0° C. The theoretical oxirane and nitrogen values are 4.92% and 4.31%, respectively. After two additional recrystallizations from acetone there was obtained a product having 4.8% oxirane oxygen, 4.2% nitrogen, and a melting point of 34.1 to 34.8° C.

Into a one liter stirred autoclave was charged 163 g. of 9,10-epoxy-N,N-dimethylstearamide, 100 ml. of methanol and 72 g. of dimethylamine. After heating at 115–145° C. for 4.5 hours, the reaction mixture was cooled and dried under vacuum. There was recovered 168 g. of 9(10)-dimethylamino-10(9)-hydroxy-N,N-dimethyl-stearamide having a total amine number of 149 and an amine number of 149 after acetylation with acetic anhydride (a measure of the tertiary amine content) as compared to theoretical total and tertiary amine numbers of 151.

Example II

Into a one liter stirred autoclave was charged 163 g. of 9,10-epoxy-N,N-dimethylstearamide, 100 ml. of methanol, and 87 g. of morpholine. After heating for 10 hours at 134–150° C. the reaction mixture was cooled to 80° C. and subjected to a vacuum of less than 1 mm. Hg to remove solvent and excess morpholine. There was recovered 193 g. of 9(10)-morpholino-10(9)-hydroxy-N,N-dimethyl-stearamide having a total amine number of 134, and an amine number of 132 after treatment with acetic anhydride (tertiary amine number) as compared to theoretical total and tertiary amine numbers of 136.

Example III

Into a 1 liter autoclave was charged 100 g. of 9,10-epoxy-N,N-dimethylstearamide, 200 ml. of methanol and 57 g. of ammonia. The reaction mixture was heated at 130–160° C. for 6.7 hours. Solvent and excess ammonia were removed at 80° C. under a vacuum of less than 1 mm. Hg. There was recovered 97 g. of 9(10)-amino-10(9)-hydroxy-N,N-dimethylstearamide having a total amine number of 154, a tertiary amine number of 6.7 compared to theoretical values of 164 and 0 respectively. Substantially the same results are obtained by substituting ethylene diamine for the ammonia of this example.

Example IV

Following essentially the procedure of Example I, dimethylamine was reacted with 9,10-epoxy-N-butyl-N-phenyl-stearamide. After cooling, the excess dimethyl amine and solvent were removed under vacuum. There was recovered 9(10)-dimethylamino-10(9)-hydroxy-N-butyl-N-phenylstearamide.

Example V

Example III was repeated except N-(9,10-epoxy) palmitoyl morpholine was substituted for the 9,10-epoxy-N,N-dimethylstearamide. There was recovered N-(9-(10)-amino-10(9)-hydroxy) palmitoyl morpholine.

Example VI

Following essentially the procedure of Example II, 9,10-epoxy-N,N-distearylstearamide was reacted with ethanol amine. There was formed 9(10)-ethanolamino-10(9)-hydroxy-N,N-distearylstearamide.

The foregoing examples are intended as illustrations of various embodiments of the invention and are not to be interpreted as limitations on the scope thereof.

The novel aminohydroxy fatty amides described herein are highly useful as corrosion inhibitors, fuel oil additives and ore flotation agents.

The embodiments of the present invention in which an exclusive property or privilege is claimed, are defined as follows:

1. 9-dimethylamino-10-hydroxy-N,N-dimethylstearamide.
2. 10-dimethylamino-9-hydroxy-N,N-dimethylstearamide.
3. 9-morpholino-10-hydroxy-N,N-dimethylstearamide.
4. 10-morpholino-9-hydroxy-N,N-dimethylstearamide.
5. 9-amino-10-hydroxy-N,N-dimethylstearamide.
6. 10-amino-9-hydroxy-N,N-dimethylstearamide.
7. 9-dimethylamino-10-hydroxy-N-butyl-N-phenylstearamide.
8. 10-dimethylamino-9-hydroxy-N-butyl-N-phenylstearamide.
9. N-(9-amino-10-hydroxy)palmitoyl morpholine.
10. N-(10-amino-9-hydroxy)palmitoyl morpholine.
11. 9-ethanolamino-10-hydroxy-N,N-distearylstearamide.
12. 10-ethanolamino-9-hydroxy-N,N-distearylstearamide.
13. 9-(beta-aminoethyl)amino-10-hydroxy-N,N-dimethylstearamide.
14. 10-(beta-aminoethyl)amino-9-hydroxy-N,N-dimethylstearamide.

References Cited in the file of this patent

UNITED STATES PATENTS 2,828,323    De Groote et al. _____ Mar. 25, 1958

OTHER REFERENCES

Swern et al.: J. Am. Chem. Society, vol. 74, pages 6139–6141 (1952).